United States Patent [19]

Yoshimura et al.

[11] 4,248,763

[45] Feb. 3, 1981

[54] FLUORINE-CONTAINING RESIN COMPOSITION HAVING IMPROVED THERMAL STABILITY

[75] Inventors: Tatsushiro Yoshimura, Takatsuki; Shigetake Tominaga, Ibaraki, both of Japan

[73] Assignee: Daikin Kogyo Co., Ltd., Osaka, Japan

[21] Appl. No.: 55,707

[22] Filed: Jul. 9, 1979

[30] Foreign Application Priority Data

Jul. 22, 1978 [JP] Japan .................................. 53/89609
Mar. 28, 1979 [JP] Japan .................................. 54/37588

[51] Int. Cl.³ .......................... C08K 5/40; C08K 5/39; C08K 5/37
[52] U.S. Cl. .............................. 260/42.22; 260/42.27; 260/45.75 S; 260/45.8 N; 260/45.8 NZ; 260/45.9 QB; 260/45.9 NC
[58] Field of Search ...................... 260/42.22, 45.9 QB, 260/45.8 NZ, 45.8 NC, 45.8 N, 45.75 S, 42.27

[56] References Cited

U.S. PATENT DOCUMENTS

| 3,377,193 | 4/1968 | Stilmar .............................. 260/42.22 |
| 3,557,051 | 1/1971 | Kometani et al. ............ 260/45.9 QB |
| 3,745,145 | 7/1973 | Khattab et al. ............... 260/45.85 R |
| 4,110,308 | 8/1978 | Abe et al. .......................... 260/42.22 |
| 4,115,352 | 9/1978 | Bohen et al. ................. 260/45.85 S |

FOREIGN PATENT DOCUMENTS

| 47-5418 | 2/1972 | Japan . |
| 48-37980 | 11/1973 | Japan . |
| 48-37981 | 11/1973 | Japan . |
| 48-38215 | 11/1973 | Japan . |
| 4787738 | 8/1974 | Japan . |

*Primary Examiner*—V. P. Hoke
*Attorney, Agent, or Firm*—Armstrong, Nikaido, Marmelstein & Kubovcik

[57] ABSTRACT

A melt-processable fluorine-containing resin composition having an improved thermal stability which comprises (A) a tetrafluoroethylene copolymer, a chlorotrifluoroethylene homo- or co-polymer, or a vinylidene fluoride homo- or co-polymer and (B) a mixture, as a thermal stabilizer, of (a) an amine antioxidant, (b) an organosulfurous compound and at least one member selected from the group consisting of (c) carbon black and (d) metal powder of Group VIII of the Periodic Table. The composition can be advantageously processed without causing any trouble even at an optimum sintering temperature of the fluorine-containing resin.

9 Claims, 3 Drawing Figures

FLUORINE-CONTAINING RESIN COMPOSITION HAVING IMPROVED THERMAL STABILITY

BACKGROUND OF THE INVENTION

The present invention relates to a melt-processable fluorine-containing resin composition having an excellent thermal stability, and more particularly to the composition comprising a tetrafluoroethylene (hereinafter referred to as "TFE") copolymer, a chlorotrifluoroethylene (hereinafter referred to as "CTFE") homo- or co-polymer or a vinylidene fluoride (hereinafter referred to as "VdF") homo- or co-polymer, and a thermal stabilizer, which has an improved thermal stability to high-temperature sintering and is processable under widen processing conditions with technical and economical advantages and also can provide an article having excellent physical properties.

TFE copolymers and CTFE or VdF homopolymer and copolymers are melt-processable fluorine-containing resins having especially high thermal resistance among those put on the market, and for instance, as the former there are known TFE-hexafluoropropylene copolymer, perfluorovinyl ether-TFE copolymer, ethylene-TFE copolymer and ethylene-propylene-TFE copolymer and as the latter there are known CTFE and VdF homopolymers, ethylene-CTFE copolymer and VdF-TFE copolymer, etc. These melt-processable fluorine-containing resins have melt-flowability, that is, the melt viscosity of these resins is generally lower than $10^6$ poises at an optimum processing temperature and, therefore, they provide a film having less pinholes and voids as compared with polytetrafluoroethylene which has an excellent chemical and corrosion resistance but has not melt-flowability or melt-processability, since it has an extremely high melt viscosity of from $10^{10}$ to $10^{11}$ poises even at a processing temperature, i.e. about 380° C.

The thermal stability of these melt-processable resins at high temperatures in the vicinity of their sintering temperatures is, however, inferior to that of polytetrafluoroethylene, and this makes some troubles in processing. That is to say, when the resins are heated at a suitable sintering temperature of 340° to 380° C. for a time more than 30 minutes, the resins partially cause thermal deterioration, and particularly when the coated film is considerably thick, bubbles are formed in the film inevitably. This phenomenon is accelerated by the influence of oxygen in air.

For this reason, in case of TFE-hexafluoropropylene resin, for instance, there are proposed (1) a process in which thickness of the coating per one application is controlled as small as possible (about 50μ) and the application and sintering procedures must be repeated many times until a sintered film reaches a desired thickness, and (2) a process in which a resin having a low molecular weight (of which melt viscosity is about $0.5 \times 10^4$ to about $7 \times 10^4$ poises at 380° C.) or a resin obtained by heat treatment of a high molecular weight resin (the melt viscosity of the high molecular weight resin is from about $1 \times 10^5$ to about $4 \times 10^5$ poises at 380° C.) is used for a coating composition so that the resin melts and flows at a lower temperature, and the coating is sintered at a lower temperature (320° to 340° C.) to give a sintered film.

However, the above process (1) has the disadvantage that the formation of a film having a thickness necessary in general for corrosion resistant linings, i.e. about 600 to about 1,000μ requires much labor and time in application and sintering.

Also, the above process (2) accompanies the formation of bubbles in a coated film when the thickness of the film per one application exceeds 100μ, even though the sintering has been conducted at a lower temperature (320° to 340° C.) Therefore, when it is desired to obtain a film having a thickness of more than 1,000μ, the application and sintering must be repeated more than 10 times as in the process (1). Thus, the process (2) is also low in productivity and is not economical. Further, a low molecular weight resin is inferior in stress crack resistance and solvent crack resistance and is not desirable as a corrosion resistant material. Moreover, thermal resistance of such a resin is low, the allowable range for processing temperature and period of time are narrow, and the thermal deterioration may take place during the processing. And further such a low molecular weight resin is liable to occur runs during the processing. When a lining is made on an industrial scale for a large-sized substrate, for instance, having a length of more than one meter or a substrate having an irregular thickness, temperature distribution on the surface of the substrate and difference in heat history become, of course, large, and in such a case a uniform lining of good quality is hard to obtain by the process (2).

Also, in case of ethylene-propylene-TFE copolymer and ethylene-CTFE copolymer, the bubble formation upon sintering after powder coating is not so much as TFE-hexafluoropropylene copolymer. However, when the sintering for a long time is required owing to the size and shape of a substrate to be coated, it accompanies deterioration of the resin, and as a result, the obtained film is discolored and also the durability to various environments and chemical reagents is remarkably impaired.

There are known various processes for improving the thermal stability of these melt-processable fluorine-containing resins upon sintering. For instance, Japanese Unexamined Patent Publication Nos. 122155/1976 and 122156/1976 disclose processes for improving the thermal stability of the resins by admixing two kinds of TFE-hexafluoropropylene copolymer with different melt viscosities which are thermally treated at a high temperature in the presence of steam. These processes require not only the thermal treatment of TFE-hexafluoropropylene copolymer at a high temperature of 340° to 380° C. for 2 to 5 hours, but also drying for several hours to remove moisture because of the thermal treatment in the presence of steam, and accordingly is not economical.

It is also known to use, as a thermal stabilizer for ethylene-TFE copolymer, sulfates of metals of Group IV-A of the Periodic Table such as Sn and Pb as disclosed in Japanese Patent Publication No. 37980/1973; phosphates of alkali metals, barium or metals of Group IV-A of the Periodic Table as disclosed in Japanese Patent Publication No. 37981/1973; a combination of organo phosphites and phosphates of alkali metals, barium or metals of Group IV-A of the Periodic Table as disclosed in Japanese Patent Publication No. 38215/1973; and α-alumina as disclosed in Japanese Unexamined Patent Publication No. 87738/1974. However, these thermal stabilizers merely inhibit the discoloration by thermal degradation of ethylene-TFE copolymer in the sintering at 300° C. within 30 minutes, and are not suitable for use in coating a substrate to be coated having a large size and a large heat capacity.

SUMMARY OF THE INVENTION

The present invention provides a melt-processable fluorine-containing resin composition having an improved thermal stability which comprises (A) a melt-processable fluorine-containing resin selected from the group consisting of a tetrafluoroethylene copolymer, chlorotrifluoroethylene homopolymer, a chlorotrifluoroethylene copolymer, vinylidene fluoride homopolymer and a vinylidene fluoride copolymer, and (B) a mixture, as a thermal stabilizer, of (a) an amine antioxidant, (b) an organosulfurous compound and at least one member selected from the group consisting of (c) carbon black and (d) a metal powder of Group VIII of the Periodic Table.

According to the present invention, the composition can be applied with a large thickness per one application and can be sintered under temperature and time conditions, of which allowable ranges are wide, to give a film having excellent chemical and thermal resistances.

DETAILED DESCRIPTION

The melt-processable fluorine-containing resins employed in the present invention are TFE copolymer, CTFE homo- and co-polymers, VdF homo- and co-polymers mainly containing TFE, CTFE or VdF, and their homo- and co-polymers modified with other copolymerizable monomers, and moreover are those melt-flowable with heating. These resins include (1) TFE-hexafluoropropylene copolymers containing residues of TFE and hexafluoropropylene in a weight ratio of 95:5 to 75:25, (2) TFE-perfluorovinyl ether copolymers containing residues of TFE and perfluorovinyl ether in a weight ratio of 98:2 to 90:10, (3) TFE-ethylene copolymers containing residues of TFE and ethylene in a weight ratio of 78:22 to 93:17, (4) TFE-ethylene-propylene copolymers containing residues of TFE, ethylene and propylene in a weight ratio of 40 to 60:25 to 50:2 to 20, (5) CTFE homopolymer, (6) CTFE-ethylene copolymers containing residues of CTFE and ethylene in a weight ratio of 75:25 to 85:15, (7) VdF homopolymer, (8) VdF-TFE copolymers containing residues of VdF and TFE in a weight ratio of 70:30 to 90:10 and (9) VdF-hexafluoroisobutylene copolymers containing residues of VdF and hexafluoroisobutylene in a weight ratio of 40:60 to 70:30. These homopolymers and copolymers may be modified with other copolymerizable monomers such as propylene, isobutylene, vinyl fluoride, vinylidene fluoride, trifluoroethylene, hexafluoropropylene and hexafluoroisobutylene, and the modified polymers can also be employed in the present invention. There are preferably employed in the present invention the above-mentioned resins having a particle size of 32 meshes (sieve opening: 495μ) pass, especially 60 meshes (sieve opening: 246μ) pass.

In the present invention, it is necessary to employ, as a thermal stabilizer, a mixture of (a) an amine antioxidant, (b) an organosulfurous compound and at least one member selected from the group consisting of (c) carbon black and (d) a metal powder of Group VIII of the Periodic Table.

The amine antioxidants (a) usable in the present invention are antioxidants usually employed for polyolefin resins, and include dinaphthylamine, phenyl-α-naphthyl-amine, phenyl-β-naphthylamine, diphenyl-p-phenylenediamine, di-β-naphthyl-p-phenylenediamine, phenylcyclohexyl-p-phenylenediamine, aldol-α-naphthyl-diphenylamine, and their derivatives such as those obtained by introducing a substituent group to phenyl or naphthyl group of the above antioxidants, e.g. a reaction product of diphenylamine and diisobutylene, and a diphenylamine derivative having the following general formula [I]:

wherein R¹ and R² are or octyl group. These amine antioxidants may be employed singly or in admixture thereof, and also those having a particle size of not more than 70μ are preferably employed.

Examples of the organosulfurous compound (b) employed in the present invention are benzoimidazole type mercaptan compounds and their salts having the following general formula [II]:

wherein X is H, Zn, Sn or Cd atom, and n is an integer of 1 to 4, benzothiazole type mercaptan compounds and their salts having the following general formala [III]:

wherein X is H, Zn, Sn or Cd atom, and n is an integer of 1 to 4, dithiocarbamic acids and their salts having the following general formula [IV]:

wherein R¹ and R² are an alkyl or aryl group having 2 to 16 carbon atoms, M is H, Zn, Sn, Cd or Cu atom, and n is an integer of 1 to 4, thiuram compounds, e.g. thiu- ram monosulfide, having the following general formula [V]:

wherein $R^1$, $R^2$, $R^3$ and $R^4$ are an alkyl or aryl group having 2 to 16 carbon atoms, thiuram compounds, e.g. thiuram disulfide, having the following general formula [VI]:

wherein $R^1$, $R^2$, $R^3$ and $R^4$ are an alkyl or aryl group having 2 to 16 carbon atoms, and organo tin mercaptides having the following general formula [VII]:

wherein $R^1$ and $R^2$ are the same or different and each is an alkyl or aryl group having 2 to 16 carbon atoms, and $R^3$ is hydrogen atom, or an alkyl or aryl group, such as dialkyl, alkylaryl or diaryl tin mercaptides, especially di($C_6$ or less lower alkyl) tin mercaptides, e.g. dibutyl tin mercaptides.

These organosulfurous compounds may be employed singly or in admixture thereof, and also those having a particle size of not more than 70μ are preferably employed.

Commercially available carbon black powders are suitably employed as the component (c) in the present invention without particular limitation. Particularly, from a viewpoint of dispersibility into resin it is preferred to employ the carbon black powder having a particle size of not more than 1μ, especially not more than 50 mμ.

Iron, cobalt and nickel powders are preferably employed as the powder (d) of metals of Group VIII of the Periodic Table. The metal powders may be employed singly or in admixture thereof. Although commercially available metal powders are suitably empolyed without particular limitation, the metal powders having a particle size of not more than 250μ, especially not more than 70μ are preferred from a viewpoint of dispersibility into resin.

When the carbon black (c) is employed, tin and zinc powders can also be employed as the component (d), and in that case, the component (d) is selected from metal powders of tin, zinc and Group VIII of the Periodic Table, e.g. iron, cobalt and nickel.

Although the single use of the above-mentioned component (a), (b), (c) or (d) has also an effect on the improvement of the thermal stability upon sintering of the melt-processable fluorine-containing resins, the thermal stability can be remarkably improved when these components are suitably admixed and employed as the thermal stabilizer in the form of mixture.

The amine antioxidants and organosulfurous compounds employed as the components (a) and (b) in the present invention are compounds known as the antioxidants for polyolefins. They have been considered to be ineffective as thermal stabilizers for the melt-processable fluorine-containing resins, since they rapidly thermally decompose and gasify in a temperature range of about 300° to about 400° C. which is the sinternig temperature of the melt-processable fluorine-containing resins. In fact, phenol type antioxidants widely employed for polyolefins have no effect as the thermal stabilizer on the melt-processable fluorine-containing resins employed in the invention or impair the thermal stability, even if they are employed singly or in combination with other phenol type antioxidants.

The organic compounds employed as the components (a) and (b) of the thermal stabilizer in the present invention have a surprising effect of thermally stabilizing the melt-processable fluorine-containing resins when they are employed in combination with the component (c) and/or the component (d), despite that about 80% by weight decomposes and gasifies at a temperature of about 330° to about 380° C., and the fluorine-containing resins can be maintained stable during sintering.

Each of the above-mentioned components (a), (b) and (d) is employed in an amount of 0.05 to 10 parts by weight, preferably 0.1 to 5 parts by weight, more preferably 0.5 to 3 parts by weight, per 100 parts by weight of the melt-processable fluorine-containing resin. Also, the component (c) is employed in an amount of 0.01 to 5 parts by weight, preferably 0.01 to 2 parts by weight, per 100 parts by weight of the melt-processable fluorine-containing resin. Also, total amounts of these components, namely the amount of the stabilizer in the form of mixture, should be not more than 10 parts by weight per 100 parts by weight of the melt-processable fluorine-containing resin. When the amount of any one of these components is smaller than the above range, the effect of improving the stability is poor. Also, when the amount is larger than the above range, the obtained film is discolored due to decomposition products of the stabilizer components themselves or a remaining residue of the stabilizer components themselves, or the chemical resistance of the film is decreased.

When the carbon black component (c) is employed in combination with the other components, the synergistic effect on the improvement of the thermal stability is remarkable, and the amount of carbon black is particularly important for the present invention. The carbon black powder is employed in an amount of 0.01 to 5 parts by weight, preferably 0.01 to 2 parts by weight, per 100 parts by weight of the melt-processable fluorine-containing resin, and when the amount is smaller than the above range, the synergistic effect is not so remarkable, and on the other hand, when the amount is larger than the above range, the synergistic effect cannot be obtained and also the chemical resistance of the obtained film is lowered.

Any other known additives, e.g. pigments such as titanium dioxide and cobalt oxide, reinforcing agents such as glass or carbon fiber powder and mica, leveling agents, and antistatic agents, may suitably added to the fluorine-containing resin composition of the present invention.

The fluorine-containing resin composition of the present invention may be employed in the form of solid for molding process, or in the form of dispersion or slurry wherein the composition is dispersed in an organic medium or an aqueous medium.

Any of dry and wet methods may be applicable to blending the melt-processable fluorine-containing resin and the thermal stabilizer, and is suitably selected according to the desired form of the composition for use. To obtain the composition for use in powder coating, it is, of course, preferable to conduct the blending in the form of powder, and in which usual blenders and pulverizers such as Hosokawa Micro Sample Mill made by Hosokawa Tekkosho Kabushiki Kaisha, V shaped blender, cone shaped blender and Ribbon Blender made by Fuji Sangyo Co., Ltd. may be employed without particular limitation. The blending is conducted preferably at a temperature of less than about 200° C. so that the amine antioxidant and organosulfurous compound are not influenced by heat, and for the same reason it is also necessary to take care so that the composition is not subjected to the influence of heat at a temperature higher than about 200° C. prior to using it for coating. When the blending is carried out by a wet process, the fluorine-containing resin and the stabilizer are blended in water, in an organic solvent such as toluene, xylene, chloroform, perchloroethylene, trichloroethylene or an alcohol, or in a mixture of water and the organic solvent. In case of using water as a medium, in order to uniformly disperse each component it is preferred to add a surface active agent such as sodium alkylbenzenesulfonate, sodium alkylsulfate, polyethyleneglycol alkylphenyl ether, polyethyleneglycol alkyl ether or ammonium perchlorofluorocaprylate. The wet blending is conducted by employing any apparatuses for agitation or blending such as ball mill, vibrating ball mill, sand mill and roll mill without particular limitation.

The present invention is more particularly described and explained by means of the following Examples and Comparative Examples, in which all parts are by weight unless otherwise noted.

EXAMPLES 1 to 13 AND COMPARATIVE EXAMPLES 1 to 8

A 50 liter kneader having four agitating blades (commercially available under the tradename "Speed Kneader" made by Showa Engineering Kabushiki Kaisha) was charged with 10 kg. of TFE-hexafluoropropylene (hexafluoropropylene being hereinafter referred to as "HFP") copolymer (TFE/HFP=88/12 by weight) having a particle size of 60 meshes pass and a prescribed amount of a thermal stabilizer shown in Table 1, and the agitating blades were rotated for 30 minutes at a speed of 1,500 r.p.m. to prepare a fluorine-containing resin composition in the form of powder.

A rectangular frame having a size of 10 cm.×5 cm. was placed on an aluminum plate, and the composition in the form of powder was placed in the frame in an amount calculated on the basis of the specific gravity of the obtained film after sintering so that the film may have a thickness of 50μ, 100μ, 150μ, 200μ, 300μ or 600μ. After removing the frame gently, the composition on the aluminum plate was sintered in an electric oven at a temperature of 370°±5° C. for 2 hours. The above procedures were repeated to give 7 films having different thickness on each composition.

After the completion of the sintering, appearance of the obtained film was observed, and it was represented on Table 1 according to the following criteria.

×: State of bubble formation of the film having a thickness of 100μ obtained in Comparative Example 1 in which no thermal stabilizer was used. In that case, an infinite number of bubbles having a diameter of 1 to 2 mm. were present, and this state of bubble formation was made standard on determining the state of bubble formation of other films.

××: State of bubble formation being inferior to the above standard film

Δ: State of bubble formation being improved to some extent as compared with the standard film ○: Only several bubbles being present ◎: No bubble being observed Although the films were prepared by a method different from usual powder coating method in order to adjust exactly the thickness of the films, the above sintering conditions are approximately the same as those applied to the practical powder coating, and it was also confirmed that the state of bubble formation well corresponded to that in the practical powder coating.

The results are shown in Table 1.

The thermal stabilizers A to P shown in Table 1 are as follows:

A: 4,4'-bis(α,α'-dimethylbenzyl)diphenylamine

B: cobalt powder having a particle size of 1 to 2μ

C: zinc salt of 2-mercaptobenzothiazole

D: Mixture of 4,4'-bis(α,α'-dimethylbenzyl)diphenylamine and cobalt powder having a particle size of 1 to 2μ (6:1 by weight)

E: Mixture of 4,4'-bis(α,α'-dimethylbenzyl)diphenylamine and zinc salt of 2-mercaptobenzothiazole (1:1 by weight)

F: Mixture of di-β-naphthyl-p-phenylenediamine and zinc salt of 2-mercaptobenzoimidazole (2:1 by weight)

G: Mixture of 4,4'-bis(α,α'-dimethylbenzyl)diphenylamine, zinc salt of 2-mercaptobenzothiazole and iron powder having a particle size of not more than 40μ (3:3:2 by weight)

H: Mixture same as the above mixture G excepting the use of cobalt powder having a particle size of 1 to 2μ instead of iron powder I: Mixture same as the above mixture G excepting the use of nickel powder having a particle size of 325 meshes pass instead of iron powder J: Mixture of phenyl-β-naphthylamine, 2-mercaptobenzoimidazole and iron powder having a particle size of not more than 40μ (3:3:2 by weight)

K: Mixture same as the above mixture J excepting the use of nickel powder having a particle size of not more than 40μ instead of iron powder L: Mixture same as the above mixture J excepting the use of cobalt powder having a particle size of 1 to 2μ instead of iron powder M: Mixture of di-β-naphthyl-p-phenylenediamine, zinc salt of 2-mercaptobenzoimidazole and cobalt powder having a particle size of 1 to 2μ (3:3:1 by weight)

N: Mixture of tetramethylthiuram disulfide, monooctyldiphenylamine, dioctyldiphenylamine and nickel powder having a particle size of not more than 40μ (2:0.5:0.5:0.5 by weight)

O: Mixture of dibutyl tin mercaptide (commercially available under the tradename "AP-52" made by Tokyo Fine Chemical Kabushiki Kaisha), diphenyl-p-phenylenediamine and cobalt powder having a particle size of 1 to 2μ (4:2:1 by weight)

P: Mixture of dibutyl tin mercaptide (commercially available under the tradename "AP-52" made by Tokyo Fine Chemical Kabushiki Kaisha), phenylcyclohexyl-p-phenylenediamine and nickel powder having a particle size of not more than 40μ (3:3:1 by weight)

TABLE 1

| | Thermal stabilizer | | State of film | | | | | | |
|---|---|---|---|---|---|---|---|---|---|
| | Kind | Amount (PHR) | 50μ | 100μ | 150μ | 200μ | 250μ | 300μ | 600μ |
| Com. Ex. 1 | — | — | ○ | X | XX | XX | XX | XX | XX |
| Com. Ex. 2 | A | 2 | ◎ | ○ | ○ | X | X | XX | XX |
| Com. Ex. 3 | B | 2 | ◎ | X | X | XX | XX | XX | XX |
| Com. Ex. 4 | C | 2 | ◎ | ○ | ○ | X | X | XX | XX |
| Com. Ex. 5 | D | 2 | ◎ | ○ | ○ | X | X | XX | XX |
| Com. Ex. 6 | E | 1 | ◎ | ○ | ○ | X | X | X | XX |
| Com. Ex. 7 | E | 2 | ◎ | ◎ | ○ | ○ | ○ | X | XX |
| Com. Ex. 8 | F | 2 | ◎ | ◎ | ○ | ○ | ○ | ○ | XX |
| Ex. 1 | G | 1 | ◎ | ◎ | ◎ | ○ | ○ | ○ | X |
| Ex. 2 | G | 2 | ◎ | ◎ | ◎ | ◎ | ◎ | ◎ | ◎ |
| Ex. 3 | H | 2 | ◎ | ◎ | ◎ | ◎ | ◎ | ◎ | ◎ |
| Ex. 4 | I | 2 | ◎ | ◎ | ◎ | ◎ | ◎ | ◎ | ◎ |
| Ex. 5 | J | 1 | ◎ | ◎ | ◎ | ◎ | ○ | ○ | X |
| Ex. 6 | K | 1 | ◎ | ◎ | ◎ | ◎ | ○ | ○ | X |
| Ex. 7 | L | 1 | ◎ | ◎ | ◎ | ◎ | ○ | ○ | X |
| Ex. 8 | M | 0.5 | ◎ | ○ | ○ | △ | X | X | XX |
| Ex. 9 | M | 1 | ◎ | ◎ | ◎ | ○ | ○ | △ | X |
| Ex. 10 | M | 2 | ◎ | ◎ | ◎ | ◎ | ◎ | ◎ | ○ |
| Ex. 11 | N | 2 | ◎ | ◎ | ◎ | ○ | ○ | ○ | XX |
| Ex. 12 | O | 2 | ◎ | ◎ | ◎ | ◎ | ◎ | ◎ | ○ |
| Ex. 13 | P | 2 | ◎ | ◎ | ◎ | ◎ | ◎ | ○ | ○ |

EXAMPLES 14 TO 17 AND COMPARATIVE EXAMPLES 9 TO 14

The procedures of the preceding Examples were repeated except that CTFE homopolymer, VdF homopolymer or VdF-TFE copolymer (VdF:TFE=87:13 by weight) as a melt-processable fluorine-containing resin and a thermal stabilizer were employed as shown in Table 2 and the sintering was conducted under conditions as shown in Table 2.

The results of observation of the sintered films are shown in Table 2, in which the state of film was judged according to the following criteria.
a: No bubble being observed
b: A few bubbles being observed
c: Several bubbles being observed
d: Considerable number of bubbles being observed all over the film
e: Noticeable amount of bubbles being observed all over the film

EXAMPLE 18

A mixture of (1) 4,4'-bis($\alpha,\alpha'$-dimethylbenzyl)-diphenylamine, (2) zinc salt of 2-mercaptobenzothiazole and (3) cobalt powder having a particle size of 1 to 2μ (3:3:1 by weight) was added as a thermal stabilizer to 10 kg. of finely divided TFE-HFP copolymer (TFE/HFP=85/15 by weight) having a particle size of 60 meshes pass in an amount of 0.5 part, 1 part or 2 parts per 100 parts of the copolymer, and they were blended in the same manner as in Example 1. The above procedures were repeated to give three compositions containing 0.5 part, 1 part and 2 parts of the thermal stabilizer mixture respectively, per 100 parts of the copolymer.

Each composition was applied to a steel plate having a thickness of 8 mm. which was previously preheated to 400° C., by a powder spraying method in such an amount as to give, after sintering, a film having a thickness of about 500μ.

The obtained coated plate was placed in a hot air circulating electric oven, and was sintered under varied temperature and time conditions to determine critical

TABLE 2

| | Thermal stabilizer | | Fluorine-containing resin | Sintering condition | | State of film | |
|---|---|---|---|---|---|---|---|
| | Kind | Amount (PHR) | | °C. | hour | 400 μ | 600 μ |
| Com. Ex. 9 | — | — | CTFE homopolymer | 300 | 5 | d | e |
| Com. Ex. 10 | — | — | VdF homopolymer | 260 | 3 | c | d |
| Com. Ex. 11 | — | — | VdF-TFE copolymer | 260 | 3 | c | d |
| Com. Ex. 12 | A | 2 | CTFE homopolymer | 300 | 5 | c | e |
| Com. Ex. 13 | B | 2 | CTFE homopolymer | 300 | 5 | d | e |
| Com. Ex. 14 | C | 2 | CTFE homopolymer | 300 | 5 | c | e |
| Ex. 14 | G | 2 | CTFE homopolymer | 300 | 5 | a | a |
| Ex. 15 | M | 2 | CTFE homopolymer | 300 | 5 | a | b |
| Ex. 16 | M | 2 | VdF-TFE copolymer | 260 | 3 | a | b |
| Ex. 17 | O | 2 | VdF homopolymer | 260 | 3 | a | a | sintering condition under which a film leaving no traces of bubbles could be obtained.

Figure 1:
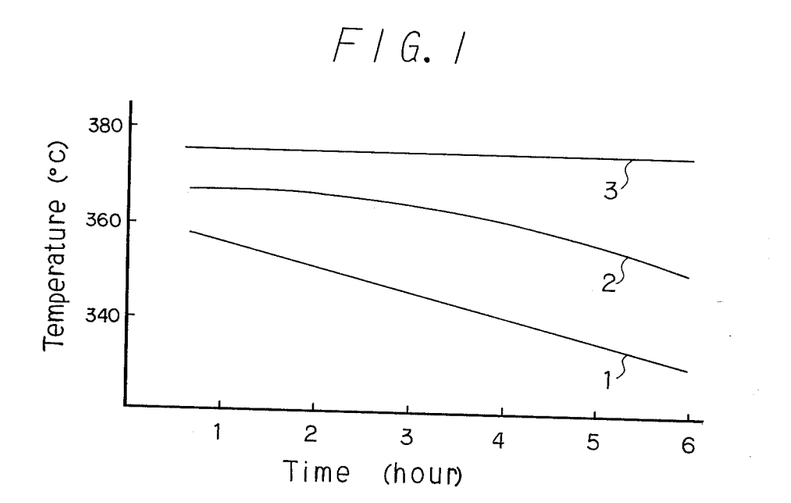
FIGS. 1, 2 and 3 are graphs showing critical sintering conditions of the melt-processable fluorine-containing resin compositions of the present invention.

The results are shown in FIG. 1, in which curves 1, 2 and 3 show the cases containing the thermal stabilizer mixture in amounts of 0.5, 1 and 2 parts, respectively, per 100 parts of the copolymer.

EXAMPLE 19

The procedures of Example 18 were repeated except that a mixture containing the components (1), (2) and (3) in a weight ratio of 3:3:2 was employed as the thermal stabilizer and two compositions containing 1 part and 2 parts of the thermal stabilizer mixture respectively, per 100 parts of the copolymer were prepared.

Each composition was applied to a steel plate having a thickness of 8 mm. which was previously preheated to 400° C., by a powder spraying method, and after provisionally sintering the coated plate in an electric oven at 370° C. for 20 minutes, the plate was taken out from the oven and was immediately applied again with the composition by a powder spraying method so that the total thickness of a film obtained after sintering became about 1,000μ.

Each thus obtained coated plate was sintered in the same manner as in Example 18 to determine critical sintering condition under which a film leaving no traces of bubbles could be obtained.

Figure 2:
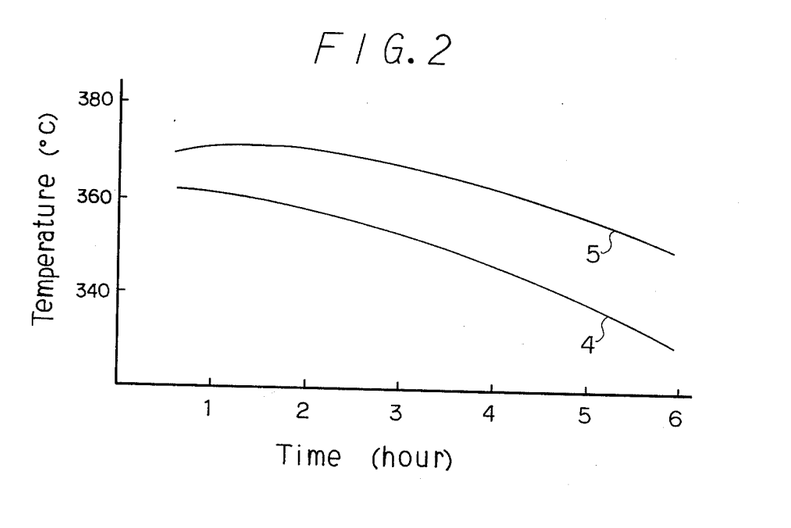

The results are shown in FIG. 2, in which curves 4 and 5 show the cases containing the thermal stabilizer mixture in amounts of 1 and 2 parts, respectively, per 100 parts of the copolymer.

EXAMPLE 20

The procedures of Example 18 were repeated except that 15 parts of a glass fiber powder having an average diameter of 10μ and an average fiber length of 60μ was further employed per 100 parts of the copolymer in addition of the copolymer and the thermal stabilizer mixture.

Figure 3:
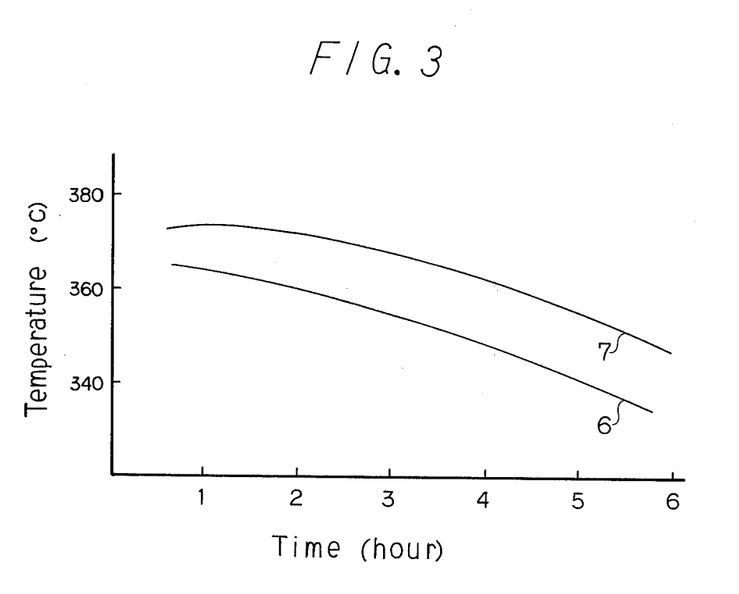

The results are shown in FIG. 3, in which curves 6 and 7 show the cases containing the thermal stabilizer mixture in amounts of 1 and 2 parts, respectively, per 100 parts of the copolymer.

It is observed from the comparison of FIG. 3 with FIG. 1 that the thermal stabilization effect cannot be impaired by the addition of additives such as pigments and reinforcing agents.

EXAMPLES 21 TO 28 AND COMPARATIVE EXAMPLES 15 TO 19

A 50 liter kneader having four agitating blades (commercially available under the tradename "Speed Kneader" made by Showa Engineering Kabushiki Kaisha) was charged with 10 kg. of TFE-HFP copolymer (TFE/HFP=88/12 by weight) having a particle size of 60 meshes pass and a thermal stabilizer as shown in Table 3, and the agitating blades were rotated for 30 minutes at a speed of 1,500 r.p.m. to prepare a fluorine-containing resin composition in the form of powder.

A rectangular frame having a size of 10 cm.×5 cm. was placed on an aluminum plate, and the composition in the form of powder was placed in the frame in such an amount as to give, after sintering, a film having a thickness of 600μ. After removing the frame gently, the composition on the aluminum plate was sintered in an electric oven at a temperature of 350° C., 360° C., 370° C. or 380° C. for 2 hours.

The above procedure was repeated on every compositions.

After the completion of the sintering, the state of the film was observed and judged according to the same criteria as described in Examples 14 to 17.

The results are shown in Table 3.

The thermal stabilizers shown in Table 2 are as follows:

E: Mixture of 4,4′-bis($\alpha,\alpha'$-dimethylbenzyl)diphenylamine and zinc salt of 2-mercaptobenzothiazole (1:1 by weight)

Q: Mixture of di-$\beta$-naphthyl-p-phenylenediamine and zinc salt of 2-mercaptobenzothiazole (1:1 by weight)

R: Mixture of dibutyl-tin-mercaptide and phenylcyclohexyl-p-phenylenediamine (1:1 by weight)

As is clear from Table 3, the state of the sintered films obtained from the compositions of the invention was very good as compared with the film obtained in Comparative Examples. The bubble formation is well inhibited so as to give the smooth surface and no deterioration of the resin itself is observed.

TABLE 3

| | Thermal stabilizer | | | State of film | | | |
|---|---|---|---|---|---|---|---|
| | Kind | Amount (PHR) | Amount of carbon black (PHR) | 350° C. | 360° C. | 370° C. | 380° C. |
| Ex. 21 | E | 2 | 0.01 | a | a | c | d |
| Ex. 22 | E | 2 | 0.03 | a | a | b | d |
| Ex. 23 | E | 2 | 0.1 | a | a | a | b |
| Ex. 24 | E | 2 | 1.0 | a | a | b | b |
| Ex. 25 | E | 2 | 2.0 | a | a | c | d |
| Ex. 26 | E | 2 | 5.0 | a | b | c | d |
| Ex. 27 | Q | 2 | 0.1 | a | a | b | d |
| Ex. 28 | R | 22 | 0.1 | a | a | b | c |
| Com. Ex. 15 | — | — | — | d | e | e | e |
| Com. Ex. 16 | E | 2 | — | a | c | e | e |
| Com. Ex. 17 | Q | 2 | — | a | c | e | e |
| Com. Ex. 18 | R | 2 | — | a | b | c | e |
| Com. Ex. 19 | — | — | 2.0 | d | e | e | e |

EXAMPLES 29 to 32

The procedures of Examples 21 to 28 were repeated except that the thermal stabilizers shown in Table 4 were employed, in order to observe the synergistic effect by the use of carbon black.

The results are shown in Table 4.

The thermal stabilizers shown in Table 4 are as follows:

S: Mixture of 4,4'-bis($\alpha,\alpha'$-dimethylbenzyl)diphenylamine, 2-mercaptobenzothiazole and cobalt powder having a particle size of 1 to $2\mu$ (3:3:2 by weight)

T: Mixture of phenyl-$\beta$-naphthylamine, 2-mercaptobenzothiazole and tin powder having a particle size of not more than $74\mu$ (3:3:2 by weight)

As is clear from Table 4, the thermal stability is further improved by the use of carbon black powder.

TABLE 4

| | Thermal stabilizer | | | State of film | | | |
|---|---|---|---|---|---|---|---|
| | Kind | Amount (PHR) | Amount of carbon black (PHR) | 350° C. | 360° C. | 370° C. | 380° C. |
| Ex. 29 | S | 2 | — | a | a | a | c |
| Ex. 30 | T | 2 | — | a | b | d | e |
| Ex. 31 | S | 2 | 0.05 | a | a | a | a |
| Ex. 32 | T | 2 | 0.1 | a | a | b | c |

EXAMPLES 33 TO 51 AND COMPARATIVE EXAMPLES 20 TO 25

A melt-processable fluorine-containing resin composition in the form of powder was prepared in the same manner as in Example 1 except that a fluorine-containing resin having a particle size of 60 meshes pass and a thermal stabilizer were employed as shown in Table 5.

The composition was placed in a fluidized bed, and the powder was fluidized. A steel plate having a thickness of 10 mm. which was previously preheated to 380° C. was then dipped to adhere the powder to the plate. The powder adhered to the plate was then sintered under a condition shown in Table 5 to give a test specimen having a film of $300\pm50\mu$ in thickness.

The thus obtained test specimen was placed in an autoclave containing high pressure saturated steam, and steam resistance test was carried out. The high pressure steam resistance of the film was judged according to the following criteria.

○: No change

Δ: Whitening (a large number of fine hair cracks being observable by a microscope of about 40 magnifications)

X: Occurrence of cracks observable by the naked eye

The results of the high pressure steam resistance are shown in Table 5 together with the results of Comparative Examples where no thermal stabilizer was employed.

As is clear from the results, the films prepared from the compositions of the invention containing thermal stabilizers have a high durability to superheated steam, while the films containing no thermal stabilizer as shown in Comparative Examples are thermally deteriorated in part under a severe sintering condition and is colored and this causes lowering of the stress crack resistance in superheated steam.

Thermal stabilizers shown in Table 5 are as follows:

U: Mixture of zinc salt of 2-mercaptobenzothiazole, phenyl-$\beta$-naphthylamine and cobalt powder having a particle size of 1 to $2\mu$ (2:1:1 by weight)

V: Mixture of copper dimethyldithiocarbamate, 4,4'-bis-($\alpha,\alpha'$-dimethylbenzyl)diphenylamine and cobalt powder having a particle size of 1 to $2\mu$ (3:3:1 by weight)

W: Mixture of zinc salt of 2-mercaptobenzoimidazole, phenyl-$\beta$-naphthylamine and nickel powder having a particle size of not more than $40\mu$ (3:3:2 by weight)

X: Mixture of zinc salt of ethylphenyldithiocarbamate, di-$\beta$-naphthylphenylenediamine and nickel powder having a particle size of not more than $40\mu$ (2:4:1 by weight)

Y: Mixture of 4,4'-bis($\alpha,\alpha'$-dimethylbenzyl)diphenylamine, 2-mercaptobenzoimidazole and cobalt powder having a particle size of 1 to $2\mu$ (2:4:1 by weight)

Z: Mixture of zinc salt of 2-mercaptobenzoimidazole, di-$\beta$-naphthyl-p-phenylenediamine and nickel powder having a particle size of 1 to $2\mu$ (3:3:1 by weight)

TABLE 5

| | Fluorine-containing resin | | | Thermal stabilizer | | | High pressure steam resistance | | | |
|---|---|---|---|---|---|---|---|---|---|---|
| | Kind (molar ratio) | Sintering condition °C | hour | Kind | Amount PHR | Amount of carbon black | 120° C. 40 days | 140° C. 7 days | 160° C. 1 day | 160° C. 7 days |
| Com. Ex. 20 | E/P/TFE = 17.0/6.5/76.5 | 290 | 0.5 | — | — | — | Δ | Δ | — | X |
| Com. Ex. 21 | E/P/TFE = 17.0/6.5/76.5 | 270 | 2 | — | — | — | X | X | — | X |
| Ex. 33 | E/P/TFE = 17.0/6.5/76.5 | 270 | 2 | U | 1 | — | | | — | Δ |
| Ex. 34 | E/P/TFE = 17.0/6.5/76.5 | 270 | 4 | U | 1 | — | | | — | Δ |
| Ex. 35 | E/P/TFE = 17.0/6.5/76.5 | 270 | 6 | U | 1 | — | Δ | | — | Δ |
| Ex. 36 | E/P/TFE = 17.0/6.5/76.5 | 270 | 2 | V | 2 | — | | | — | Δ |
| Ex. 37 | E/P/TFE = 17.0/6.5/76.5 | 300 | 2 | V | 1 | — | | | — | Δ |
| Ex. 38 | E/P/TFE = 17.0/6.5/76.5 | 270 | 2 | U | 1 | 0.05 | | | — | |
| Ex. 39 | E/P/TFE = 17.0/6.5/76.5 | 270 | 4 | V | 1 | 0.1 | | | — | |
| Ex. 40 | E/P/TFE = 17.0/6.5/76.5 | 300 | 2 | Z | 1 | 0.1 | | | — | |
| Com. | E/TFE = | | | | | | | | | |

TABLE 5-continued

| | Fluorine-containing resin | | | Thermal stabilizer | | High pressure steam resistance | | | |
|---|---|---|---|---|---|---|---|---|---|
| | Kind | Sintering condition | | | Amount | 120° C. | 140° C. | 160° C. | 160° C. |
| | (molar ratio) | °C. | hour | Kind | Amount PHR | Amount of carbon black | 40 days | 7 days | 1 day | 7 days |
| Ex. 22 Com. | E/TFE = 19.8/80.2 | 320 | 1 | — | — | — | | | X | X |
| Ex. 23 | E/TFE = 19.8/80.2 | 320 | 2 | — | — | — | | | X | X |
| Ex. 41 | E/TFE = 19.8/80.2 | 320 | 2 | U | 1 | — | | | | Δ |
| Ex. 42 | E/TFE = 19.8/80.2 | 320 | 1 | W | 2 | — | | | | Δ |
| Ex. 43 | E/TFE = 19.8/80.2 | 320 | 2 | W | 0.5 | — | | | Δ | Δ |
| Ex. 44 | E/TFE = 19.8/80.2 | 320 | 2 | W | 2 | — | | | | |
| Ex. 45 | E/TFE = 19.8/80.2 | 320 | 1 | X | 2 | — | | | | Δ |
| Ex. 46 | E/TFE = 19.8/80.2 | 320 | 2 | U | 1 | 0.05 | | | | |
| Ex. 47 | E/TFE = 19.8/80.2 | 320 | 2 | V | 1 | 0.05 | | | | |
| Ex. 48 | E/TFE = 19.8/80.2 | 320 | 2 | Z | 1 | 0.05 | | | | |
| Com. Ex. 24 | E/CTFE = 19.5/80.5 | 250 | 0.5 | — | — | — | Δ~ | Δ~ | Δ | X |
| Com. Ex. 25 | E/CTFE = 19.5/80.5 | 260 | 1 | — | — | — | Δ | Δ | X | X |
| Ex. 49 | E/CTFE = 19.5/80.5 | 260 | 1 | Y | 1 | — | | | | Δ |
| Ex. 50 | E/CTFE = 19.5/80.5 | 260 | 1 | Y | 2 | — | | | | |
| Ex. 51 | E/CTFE = 19.5/80.5 | 260 | 1 | Y | 3 | — | | | | Δ |

(Note)
E: Ethylene
P: Propylene

EXAMPLES 52 TO 54 AND COMPARATIVE EXAMPLE 26

In a ball mill, 200 parts of xylene, 350 parts of cyclohexane, 300 parts of finely divided TFE-HFP copolymer (TFE/HFP=86/14 by weight) having a particle size of not more than 70μ pass and a prescribed amount of, as a thermal stabilizer, a mixture of 4,4'-bis(α,α'-dimethylbenzyl)diphenylamine, zinc salt of 2-mercaptobenzothiazole and cobalt powder having a particle size of 1 to 2μ (3:3:1 by weight) were blended for 24 hours to give a dispersion of resin and stabilizer in organic solvent.

The obtained dispersion was sprayed to aluminum plates to give coated plates having coatings of various thicknesses. After drying the coatings in an infrared dryer maintained at about 100° C., the coated plates were placed in a hot air circulating type electric oven and then sintered at 365° C. for 1.5 hours. Limit thickness to bubble formation being capable of providing a good sintered film leaving no traces of bubbles was then judged.

The results are shown in Table 6.

As is clear from the results shown in Table 6, fluorine-containing resin compositions in the form of dispersion of the present invention can be coated more thickly as compared with the dispersion not containing thermal stabilizer obtained in Comparative Example 26.

TABLE 6

| | Thermal stabilizer Amount (PHR) | Limit thickness to bubble formation in sintered film (μ) |
|---|---|---|
| Com. Ex. 26 | — | 70 to 80 |
| Ex. 52 | 0.5 | 180 to 200 |
| Ex. 53 | 1 | >300 |
| Ex. 54 | 2 | >300 |

What we claim is:

1. A melt-processable fluorine-containing resin composition having an improved thermal stability which comprises (A) a melt-processable fluorine-containing resin selected from the group consisting of a tetrafluoroethylene copolymer, chlorotrifluoroethylene homopolymer, a chlorotrifluoroethylene copolymer, vinylidene fluoride homopolymer and a vinylidene fluoride copolymer, and a stabilizing amount of (B) a mixture, as a thermal stabilizer, of (a) an amine anti-oxidant, (b) an organosulfurous compound and at least one member selected from the group consisting of (c) carbon black and (d) a metal powder of Group VIII of the Periodic Table.

2. The composition of claim 1, wherein the mixture (B) contains 0.05 to 10 parts of the component (a), 0.05 to 10 parts of the component (b) and 0.01 to 5 parts of the component (c), and said mixture (B) is present in an amount of not more than 10 parts, said parts being parts by weight per 100 parts by weight of the component (A).

3. The composition of claim 2, wherein said component (c) is present in an amount of 0.01 to 2 parts by weight per 100 parts by weight of the component (A).

4. The composition of claim 2, wherein said mixture (B) further contains 0.05 to 10 parts by weight, per 100 parts by weight of the component (A), of at least one component (d') selected from the group consisting of a zinc powder and a tin powder.

5. The composition of claim 1, wherein the mixture (B) contains 0.05 to 10 parts of the component (a), 0.05 to 10 parts of the component (b) and 0.05 to 10 parts of the component (d), and said mixture (B) is present in an amount of not more than 10 parts, all said parts being parts by weight per 100 parts by weight of the component (A).

6. The composition of claim 1, wherein said organosulfurous compound is at least one member selected from the group consisting of benzoimidazole type mercaptan compounds and their metal salts, benzothiazole type mercaptan compounds and their metal salts, dithiocarbamic acids and their metal salts, thiuram compounds and organo tin mercaptides.

7. The composition of claim 1, wherein said melt-processable fluorine-containing resin (A) is a tetrafluoroethylene copolymer or a chlorotrifluoroethylene copolymer.

8. The composition of claim 1, wherein said melt-processable fluorine-containing resin (A) is a tetrafluoroethylene-hexafluoropropylene copolymer.

9. The composition of claim 1 wherein the mixture (B) contains 0.05 to 10 parts of the component (a), 0.05 to 10 parts of the component (b), 0.01 to 5 parts of the component (c), and 0.05 to 10 parts of the component (d), and said mixture (B) is present in an amount of not more than 10 parts, said parts being parts by weight per 100 parts by weight of the component (A).

* * * * *